US011032209B2

(12) United States Patent
Chang et al.

(10) Patent No.: US 11,032,209 B2
(45) Date of Patent: Jun. 8, 2021

(54) MULTIMEDIA CONTENT CROSS SCREEN SYNCHRONIZATION APPARATUS AND METHOD, AND DISPLAY DEVICE AND SERVER

(71) Applicant: Industrial Technology Research Institute, Hsinchu (TW)

(72) Inventors: Chen-Guei Chang, Taoyuan (TW); Ming-Yen Chen, Pingtung County (TW); Chun-Hung Lien, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 433 days.

(21) Appl. No.: 15/361,014

(22) Filed: Nov. 24, 2016

(65) Prior Publication Data

US 2017/0171101 A1    Jun. 15, 2017

Related U.S. Application Data

(60) Provisional application No. 62/264,867, filed on Dec. 9, 2015.

(30) Foreign Application Priority Data

Aug. 24, 2016    (TW) .................................. 105127000

(51) Int. Cl.
*H04L 12/911* (2013.01)
*H04L 29/08* (2006.01)
(Continued)

(52) U.S. Cl.
CPC .............. *H04L 47/70* (2013.01); *H04L 65/60* (2013.01); *H04L 67/10* (2013.01); *H04L 67/26* (2013.01);
(Continued)

(58) Field of Classification Search
CPC ......... H04L 47/70; H04L 67/26; H04L 67/10; H04L 65/60; H04L 67/42; H04N 21/4725; H04N 21/42224; H04N 21/4122
(Continued)

(56) References Cited

U.S. PATENT DOCUMENTS 6,212,396 B1 * 4/2001 Brown ............... H04M 1/72511
455/450
8,516,528 B2 * 8/2013 Sandoval ................. H04N 5/06
725/80
(Continued)

FOREIGN PATENT DOCUMENTS

CN    100508593    7/2009
CN    102185878    9/2011
(Continued)

OTHER PUBLICATIONS

"Search Report of European Counterpart Application," dated Feb. 1, 2017, p. 1-p. 9.
(Continued)

*Primary Examiner* — David R Lazaro
*Assistant Examiner* — Berhanu Shitayewoldetadik
(74) *Attorney, Agent, or Firm* — JCIPRNET

(57) ABSTRACT

A multimedia content cross screen synchronization apparatus and method, and a display device and a server are provided. The apparatus includes the display device and the server. The display device provides a plurality of stream channels to a user to select and watch. Each of the stream channels displays a multimedia content. The multimedia contents of at least two channels of the stream channels contain different prompt messages. These prompt messages prompt the user to perform different corresponding behaviors. The mobile device senses a behavior of the user and generates a feedback signal corresponding to the behavior to
(Continued)

the server. The server selects a corresponding application service from a plurality of application services according to the feedback signal transmitted from the mobile device, and provides the corresponding application service to the mobile device.

19 Claims, 5 Drawing Sheets

(51) Int. Cl.
  *H04L 29/06* (2006.01)
  *G06F 15/16* (2006.01)
  *H04N 21/422* (2011.01)
  *H04N 21/41* (2011.01)
  *H04N 21/4725* (2011.01)

(52) U.S. Cl.
  CPC ... *H04N 21/4122* (2013.01); *H04N 21/42224* (2013.01); *H04N 21/4725* (2013.01); *H04L 67/42* (2013.01)

(58) Field of Classification Search
  USPC .......................................................... 709/227
  See application file for complete search history.

(56) References Cited

U.S. PATENT DOCUMENTS

| | | | |
|---|---|---|---|
| 9,173,183 B1* | 10/2015 | Ray | H04W 56/0065 |
| 9,313,359 B1 | 4/2016 | Stojancic et al. | |
| 9,432,746 B2* | 8/2016 | Spears | H04N 21/854 |
| 9,955,205 B2* | 4/2018 | Covell | H04N 21/41407 |
| 10,319,022 B2* | 6/2019 | Clayton | G06Q 30/0631 |
| 2002/0194388 A1* | 12/2002 | Boloker | G06F 8/38 |
| | | | 719/310 |
| 2003/0041334 A1* | 2/2003 | Lu | H04N 21/2187 |
| | | | 725/113 |
| 2003/0079026 A1* | 4/2003 | Watanabe | H04L 65/4076 |
| | | | 709/228 |
| 2003/0118974 A1* | 6/2003 | Obrador | G09B 23/28 |
| | | | 434/236 |
| 2004/0087348 A1* | 5/2004 | Desch | H04N 5/44543 |
| | | | 455/566 |
| 2004/0121815 A1* | 6/2004 | Fournier | H04M 1/72445 |
| | | | 455/563 |
| 2004/0259577 A1 | 12/2004 | Ackley | |
| 2006/0026302 A1* | 2/2006 | Bennett | H04N 21/4325 |
| | | | 709/246 |
| 2006/0039368 A1* | 2/2006 | Punaganti Venkata | H04L 67/26 |
| | | | 370/386 |
| 2006/0053195 A1* | 3/2006 | Schneider | H04L 67/26 |
| | | | 709/204 |
| 2007/0118857 A1* | 5/2007 | Chen | H04N 5/765 |
| | | | 725/61 |
| 2007/0243837 A1* | 10/2007 | Krishnamoorthi | H04L 25/0232 |
| | | | 455/115.1 |
| 2008/0066126 A1* | 3/2008 | Walter | H04L 65/4084 |
| | | | 725/97 |
| 2008/0147452 A1* | 6/2008 | Renz | H04L 47/70 |
| | | | 705/7.11 |
| 2008/0163075 A1* | 7/2008 | Beck | H04L 67/10 |
| | | | 715/759 |
| 2009/0013002 A1* | 1/2009 | Eggink | G11B 27/34 |
| 2009/0217356 A1* | 8/2009 | Scott | G06F 21/60 |
| | | | 726/4 |
| 2009/0228910 A1* | 9/2009 | Christinat | G06F 21/31 |
| | | | 725/11 |
| 2010/0082784 A1* | 4/2010 | Rosenblatt | H04L 12/2812 |
| | | | 709/222 |
| 2011/0063317 A1* | 3/2011 | Gharaat | G06Q 30/04 |
| | | | 345/545 |
| 2011/0276335 A1* | 11/2011 | Silvera | G11B 27/105 |
| | | | 704/275 |
| 2012/0159527 A1* | 6/2012 | Perez | H04N 21/44218 |
| | | | 725/10 |
| 2012/0196616 A1* | 8/2012 | Edge | G01S 5/0036 |
| | | | 455/456.1 |
| 2012/0231838 A1 | 9/2012 | Lyon et al. | |
| 2013/0093615 A1* | 4/2013 | Jeon | G08B 13/19695 |
| | | | 342/118 |
| 2013/0132464 A1* | 5/2013 | Dowling | H04L 67/2823 |
| | | | 709/203 |
| 2013/0169543 A1 | 7/2013 | Xia | |
| 2013/0191789 A1* | 7/2013 | Calman | G06F 3/017 |
| | | | 715/863 |
| 2013/0298147 A1* | 11/2013 | Klein | H04N 21/2668 |
| | | | 725/13 |
| 2013/0347017 A1* | 12/2013 | Li | H04N 21/23418 |
| | | | 725/18 |
| 2014/0026048 A1* | 1/2014 | Spirer | G06F 3/0484 |
| | | | 715/716 |
| 2014/0032565 A1* | 1/2014 | Parker | G06F 16/78 |
| | | | 707/741 |
| 2014/0053208 A1* | 2/2014 | Sirpal | G06F 3/04883 |
| | | | 725/52 |
| 2014/0068692 A1* | 3/2014 | Archibong | H04N 21/23424 |
| | | | 725/116 |
| 2014/0130116 A1 | 5/2014 | Krikorian | |
| 2014/0176728 A1* | 6/2014 | Birch | H04N 17/004 |
| | | | 348/181 |
| 2014/0195626 A1* | 7/2014 | Ruff | H04W 12/088 |
| | | | 709/206 |
| 2014/0223329 A1* | 8/2014 | Falaki | G06F 13/00 |
| | | | 715/747 |
| 2014/0229975 A1* | 8/2014 | Bolden | H04N 21/4622 |
| | | | 725/32 |
| 2014/0244488 A1* | 8/2014 | Kim | H04L 1/1614 |
| | | | 705/39 |
| 2014/0376526 A1* | 12/2014 | Nishikata | G08C 15/06 |
| | | | 370/336 |
| 2014/0379813 A1* | 12/2014 | Charania | H04L 51/24 |
| | | | 709/206 |
| 2015/0128046 A1* | 5/2015 | Cormican | H04N 21/23424 |
| | | | 715/720 |
| 2015/0235264 A1 | 8/2015 | Curtis et al. | |
| 2015/0358661 A1* | 12/2015 | Navarro | H04N 21/2668 |
| | | | 725/59 |
| 2015/0378587 A1* | 12/2015 | Falaki | G06F 3/0346 |
| | | | 715/747 |
| 2016/0029082 A1* | 1/2016 | Wordley | H04N 21/462 |
| | | | 725/52 |
| 2016/0050318 A1* | 2/2016 | Lu | H04L 67/2823 |
| | | | 455/411 |
| 2016/0117937 A1* | 4/2016 | Penders | G09B 5/00 |
| | | | 434/236 |
| 2016/0132236 A1* | 5/2016 | Sun | G06F 3/04886 |
| | | | 715/773 |
| 2016/0156986 A1 | 6/2016 | Oztaskent et al. | |
| 2016/0212495 A1 | 7/2016 | Chang et al. | |
| 2016/0227273 A1* | 8/2016 | Lee | H04N 21/4384 |
| 2016/0232131 A1* | 8/2016 | Liu | G06Q 10/06 |
| 2017/0012891 A1* | 1/2017 | Nylander | H04W 28/0247 |
| 2018/0032997 A1* | 2/2018 | Gordon | G06Q 30/0269 |

FOREIGN PATENT DOCUMENTS

| | | |
|---|---|---|
| CN | 102289663 | 12/2011 |
| CN | 103020650 | 4/2013 |
| CN | 103123787 | 5/2013 |
| CN | 102984382 | 6/2015 |
| CN | 104918061 | 9/2015 |
| CN | 105208449 | 12/2015 |
| EP | 2843962 | 3/2015 |
| TW | 526447 | 4/2003 |
| TW | M450018 | 4/2013 |
| TW | I456979 | 10/2014 |

(56) References Cited

FOREIGN PATENT DOCUMENTS

| TW | 201443803 | 11/2014 |
| TW | I493965 | 7/2015 |
| WO | 0211433 | 2/2002 |

OTHER PUBLICATIONS

Sadlier et al., "Automatic TV advertisement detection from MPEG bitstream," Pattern Recognition, Dec. 2002, pp. 2719-2726.

Eickeler et al., "Content-based video indexing of TV broadcast news using hidden Markov models," IEEE International Conference on Acoustics, Speech, and Signal Processing, Mar. 15-19, 1999, pp. 2997-3000.

Brown et al., "Automatic Content-Based Retrieval of Broadcast News," Proceedings of ACM Multimedia, Nov. 5-9, 1995, pp. 1-31.

Simon et al., "Enrichment of Interactive Digital TV using Second Screen," International Journal of Computer Applications, Feb. 2013, pp. 58-64.

Howson et al., "Second screen TV synchronization," IEEE International Conference on Consumer Electronics (ICCE-Berlin), Sep. 6-8, 2011, pp. 361-365.

Duong et al., "Fast second screen TV synchronization combining audio fingerprint technique and generalized cross correlation," IEEE International Conference on Consumer Electronics (ICCE-Berlin), Sep. 3-5, 2012, pp. 241-244.

"Office Action of Taiwan Counterpart Application," dated Aug. 11, 2017, p. 1-p. 20.

"Office Action of China Counterpart Application," dated Mar. 28, 2019, p. 1-p. 10.

* cited by examiner

MULTIMEDIA CONTENT CROSS SCREEN SYNCHRONIZATION APPARATUS AND METHOD, AND DISPLAY DEVICE AND SERVER

CROSS-REFERENCE TO RELATED APPLICATION

This application claims the priority benefits of U.S. provisional application Ser. No. 62/264,867, filed on Dec. 9, 2015 and Taiwan application serial no. 105127000, filed on Aug. 24, 2016. The entirety of each of the above-mentioned patent applications is hereby incorporated by reference herein and made a part of this specification.

TECHNICAL FIELD

The disclosure relates to a multimedia apparatus, and particularly relates to a multimedia content cross screen synchronization apparatus, a multimedia content cross screen synchronization method, a display device and a server.

BACKGROUND

The so-called cross screen synchronization refers to that contents displayed on different device screens may match/cooperate with each other. For example, when a program is played on a television (TV), a user probably wants to know an extended introduction of the currently viewed program (for example, wants to know a name of an actor). If a mobile device (for example, a mobile phone or a tablet personal computer) of the user may automatically implement cross screen synchronization with the display content of the TV, while the user views the TV program, the user may further obtain the extended introduction of the currently viewed program from the display content of the mobile device. In order to implement the cross screen synchronization between the display content of the mobile device and the display content of the TV, the system requires to learn the TV content currently viewed by the user. According to the existing technique, to implement TV content cross screen synchronization through the mobile device is to perform voiceprint recognition and image recognition to the TV to determine the currently viewed content such as the channel, the program, etc. of the user. However, a sound played by the TV can be interfered by a sound of a surrounding environment of the user to cause a determination error of the voiceprint recognition. Regarding the image recognition technique, the image played by the TV such as a program frame or a quick response code (QR code) may also be influenced by an ambient light of the user and a TV background, such that the image recognition may have an error. If the recognition is implemented by capturing a TV image or by recording the TV images displayed on the TV, an issue of focus error is probably occurred due to a hand shake occurred during the capturing process.

Therefore, it is required to provide a more accurate and convenient multimedia content cross screen mechanism to resolve the aforementioned issues, so as to improve a recognition effect of the program viewed by the user.

SUMMARY

The disclosure is directed to a multimedia content cross screen synchronization apparatus, a multimedia content cross screen synchronization method, a display device and a server.

An embodiment of the disclosure provides a multimedia content cross screen synchronization apparatus. The multimedia content cross screen synchronization apparatus is adapted to interact with a mobile device. The multimedia content cross screen synchronization apparatus includes a display device and a server. The display device provides a plurality of stream channels to a user to select. Each of the stream channels displays a multimedia content. The multimedia contents of at least two channels of the stream channels contain different prompt messages. These prompt messages respectively prompt the user to perform different corresponding behaviors. The mobile device senses a behavior of the user and generates a feedback signal corresponding to the behavior to the server. The server selects a corresponding application service from a plurality of application services according to the feedback signal transmitted from the mobile device, so as to provide the corresponding application service to the mobile device, where the feedback signal corresponds to the prompt message contained by the multimedia content of one of the stream channels.

Another embodiment of the disclosure provides a multimedia content cross screen synchronization method, which includes following steps: providing a plurality of stream channels by a display device to a user to select, where each of the stream channels displays a multimedia content, the multimedia contents of at least two channels of the stream channels contain different prompt messages, and these prompt messages respectively prompt the user to perform different corresponding behaviors; sensing a behavior of the user by the mobile device to generate a feedback signal corresponding to the behavior to a server, where the feedback signal corresponds to the prompt message contained in the multimedia content of one of the stream channels; selecting a corresponding application service from a plurality of application services by the server according to the feedback signal transmitted from the mobile device; and providing the corresponding application service to the mobile device by the server.

Another embodiment of the disclosure provides a display device. The display device is adapted to interact with a mobile device. The display device provides a plurality of stream channels to a user to select. Each of the stream channels displays a multimedia content. The multimedia contents of at least two channels of the stream channels contain different prompt messages. These prompt messages respectively prompt the user to perform different corresponding behaviors. When the display device receives a feedback signal corresponding to the prompt message of at least one channel of the stream channels, the display device transmits the feedback signal to a server. The feedback signal corresponds to the corresponding behavior prompted by the prompt message of at least one channel of the stream channels.

Another embodiment of the disclosure provides a server. The server is configured to add different prompt messages to multimedia contents of at least two channels of a plurality of stream channels. The prompt messages respectively prompt a user to perform different corresponding behaviors. The server is adapted to interact with a mobile device. When the server receives a feedback signal corresponding to the prompt message of at least one channel of the stream channels, the server selects a corresponding application service from a plurality of application services according to the feedback signal, so as to provide the corresponding application service to the mobile device.

Several exemplary embodiments accompanied with figures are described in detail below to further describe the disclosure in details.

BRIEF DESCRIPTION OF DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF EMBODIMENTS

Figure 1:
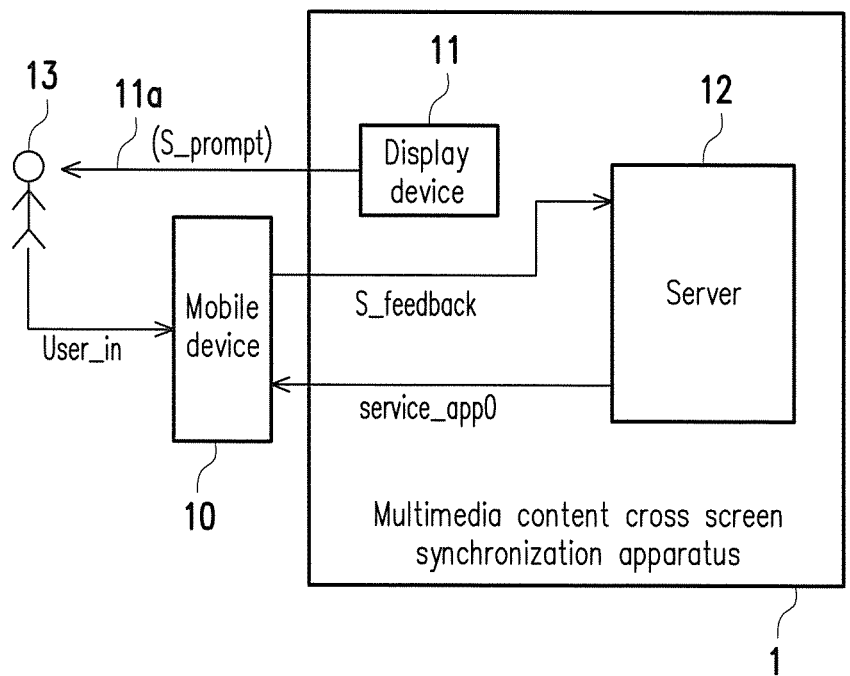
FIG. 1 is a circuit block schematic diagram of a multimedia content cross screen synchronization apparatus according to a first embodiment of the disclosure.

A term "couple (or connect)" used in the full text of the disclosure (including the claims) refers to any direct and indirect connections. For example, if a first device is described to be coupled (or connected) to a second device, it is interpreted as that the first device is directly coupled to the second device, or the first device is indirectly coupled to the second device through other devices or connection means. Moreover, wherever possible, components/members/steps using the same referential numbers in the drawings and description refer to the same or like parts. Components/members/steps using the same referential numbers or using the same terms in different embodiments may cross-refer related descriptions.

Referring to FIG. 1, FIG. 1 is a circuit block schematic diagram of a multimedia content cross screen synchronization apparatus 1 according to a first embodiment of the disclosure, where the multimedia content cross screen synchronization apparatus 1 is adapted to interact with a mobile device 10. According to an application requirement or a design requirement, the mobile device 10 can be a smart phone, a tablet personal computer (PC), a personal digital assistant or other electronic device having network communication capability. For example (but not limited to), the mobile device 10 can be a conventional smart phone or a tablet PC, so that implementation details of the conventional smart phone or the tablet PC are not repeated. The multimedia content cross screen synchronization apparatus 1 includes a display device 11 and a server 12. The display device 11 and the server 12 can be within a same device, or can be separated devices. The display device 11 can be a television, a TV set top box (STB), a digital STB, a PC, a display device of a mobile device or other video stream playing device, which is adapted provide a plurality of stream channels to a user 13 to select and watch. These stream channels respectively play different multimedia contents, such as advertisings, TV programs or other contents. For example, the user 13 may operate the display device 11 to select one channel of interest from the stream channels. After the selection is completed, the display device 11 may play images 11a of the channel of interest to the user 13.

Figure 2:
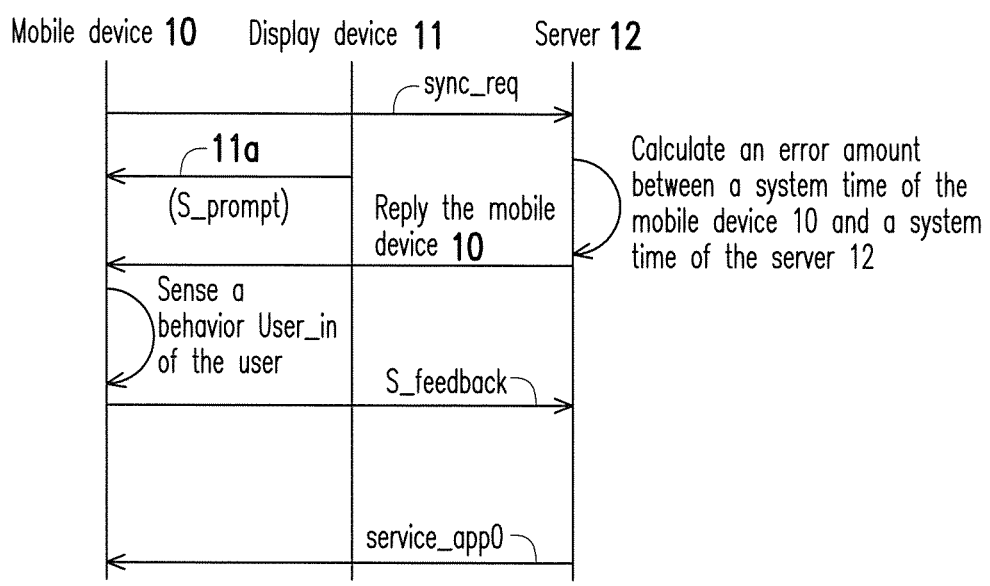
FIG. 2 is a timing schematic diagram of a communication protocol of a multimedia content cross screen synchronization apparatus according to the first embodiment of the disclosure.

FIG. 2 is a timing schematic diagram of a communication protocol according to the first embodiment of the disclosure. Referring to FIG. 1 and FIG. 2, in the present embodiment, when the user 13 wants to use a multimedia content cross screen synchronization service, the user 13 may activate a cross screen application program on the mobile device 10. After the cross screen application program is activated, the cross screen application program of the mobile device 10 sends a start synchronization service request sync_req to the server 12. After the server 12 receives the start synchronization service request sync_req from the mobile device 10, the server 12 obtains a system time of the mobile device 10 from the start synchronization service request sync_req, and calculates an error amount between the system time of the mobile device 10 and a system time of the server 12. In this way, the server 12 may decrease the probability of false determination of the viewing content caused by time setting inaccuracy of the mobile device 10 of the user 13 according to the calculated error amount. After the error amount is calculated, the server 12 may send a reply signal to the mobile device 10 to notify the mobile device 10 to start the multimedia content cross screen synchronization service.

The display device 11 may provide a plurality of stream channels to the user 13 to select and watch. For example, the user 13 may operate the display device 11 to select a channel of interest from the stream channels, and the display device 11 may play the image 11a of the channel of interest (the selected channel) to the user 13 for viewing. The multimedia contents played by at least two channels of the stream channels may contain different prompt messages S_prompt. According to a design requirement, the prompt messages S_prompt can be subtitles, symbols or other visual messages displayed on a screen of the display device 11, or sounds or other auditory messages sent by the display device 11. The prompt messages S_prompt may prompt the user 13 to perform different corresponding behaviors. According to the design requirement, the corresponding behaviors include clicking a touch panel of the mobile device 10, clicking an icon displayed by the mobile device 10, sliding on the touch panel of the mobile device 10, shaking the mobile device 10, turning over the mobile device 10, tapping the mobile device 10, making the mobile device 10 to move along a specific trajectory in space, or talking to the mobile device 10.

The mobile device 10 is configured with a sensor, for example, a touch panel, an optical sensor, a sound sensor, a gyro sensor, an acceleration sensor and/or other sensors. Therefore, the mobile device 10 may sense a behavior User_in of the user 13 to generate a feedback signal S_feedback corresponding to the behavior User_in to the server 12. In case that the behavior User_in of the user 13 conforms with the prompt message of the display device 11, the feedback signal S_feedback may correspond to the prompt message contained in the multimedia content of one of the stream channels. The server 12 may select a corresponding application service service_app0 from a plurality of application services according to the feedback signal S_feedback transmitted by the mobile device 10. In an embodiment, each of the plurality of application services may respectively correspond to one prompt message. Then, the server 12 may provide the corresponding application service service_app0 corresponding to the image 11a of the channel played by the display device 11 to the mobile device 10. Therefore, cross screen synchronization can be implemented between a display content of the mobile device 10 (i.e. the corresponding application service service_app0) and the display content of the display device 11 (i.e. the currently played channel image 11a).

In the embodiment of the disclosure, the server 12 may check whether the behavior User_in of the user 13 conforms with any one of the corresponding behaviors of the different prompt messages S_prompt according to the feedback signal S_feedback. For example, the stream channels include a stream channel A, a stream channel B and a stream channel C, where the stream channel A is playing a travel program, the stream channel B is playing a food program, and the stream channel C is playing an advertising. It is assumed that the prompt message S_prompt contained in the travel program of the stream channel A is "tap the mobile device 10 once", the prompt message S_prompt contained in the food program of the stream channel B is "tap the mobile device 10 twice", and the prompt message S_prompt contained in the advertising of the stream channel C is "shake the mobile device 10 twice". During a period that the user 13 selects and views the travel program of the stream channel A, if the user 13 is interested in a scenery spot introduced in the travel program, the user 13 may tap the mobile device 10 once according to the prompt of the prompt message S_prompt contained in the travel program. The mobile device 10 transmits the feedback signal S_feedback representing the behavior User_in to the server 12. The server 12 confirms the behavior User_in of the user 13 to be "tap the mobile device 10 once" according to the feedback signal S_feedback, and the behavior User_in conforms with the corresponding behavior "tap the mobile device 10 once" of the prompt message S_prompt of the travel program played by the stream channel A. Therefore, the server 12 may select one corresponding application service service_app0 from a plurality of application services according to the feedback signal S_feedback, for example, a map location of the scenery spot introduced in the travel program played by the stream channel A. Then, the server 12 may provide the map location of the scenery spot (the corresponding application service service_app0) to the mobile device 10. Deduced by analogy, during a period that the user 13 selects and views the food program of the stream channel B, when the user 13 taps the mobile device 10 twice according to the prompt of the prompt message S_prompt contained in the food program, the server 12 may provide a reservation service of a restaurant (the corresponding application service service_app0) introduced in the food program to the mobile device 10. During a period that the user 13 selects and views the advertising of the stream channel C, the user 13 may shake the mobile device 10 twice according to the prompt of the prompt message S_prompt contained in the advertising, and the server 12 may provide a network shopping service of a product (the corresponding application service service_app0) introduced in the advertising to the mobile device 10.

Figure 3:
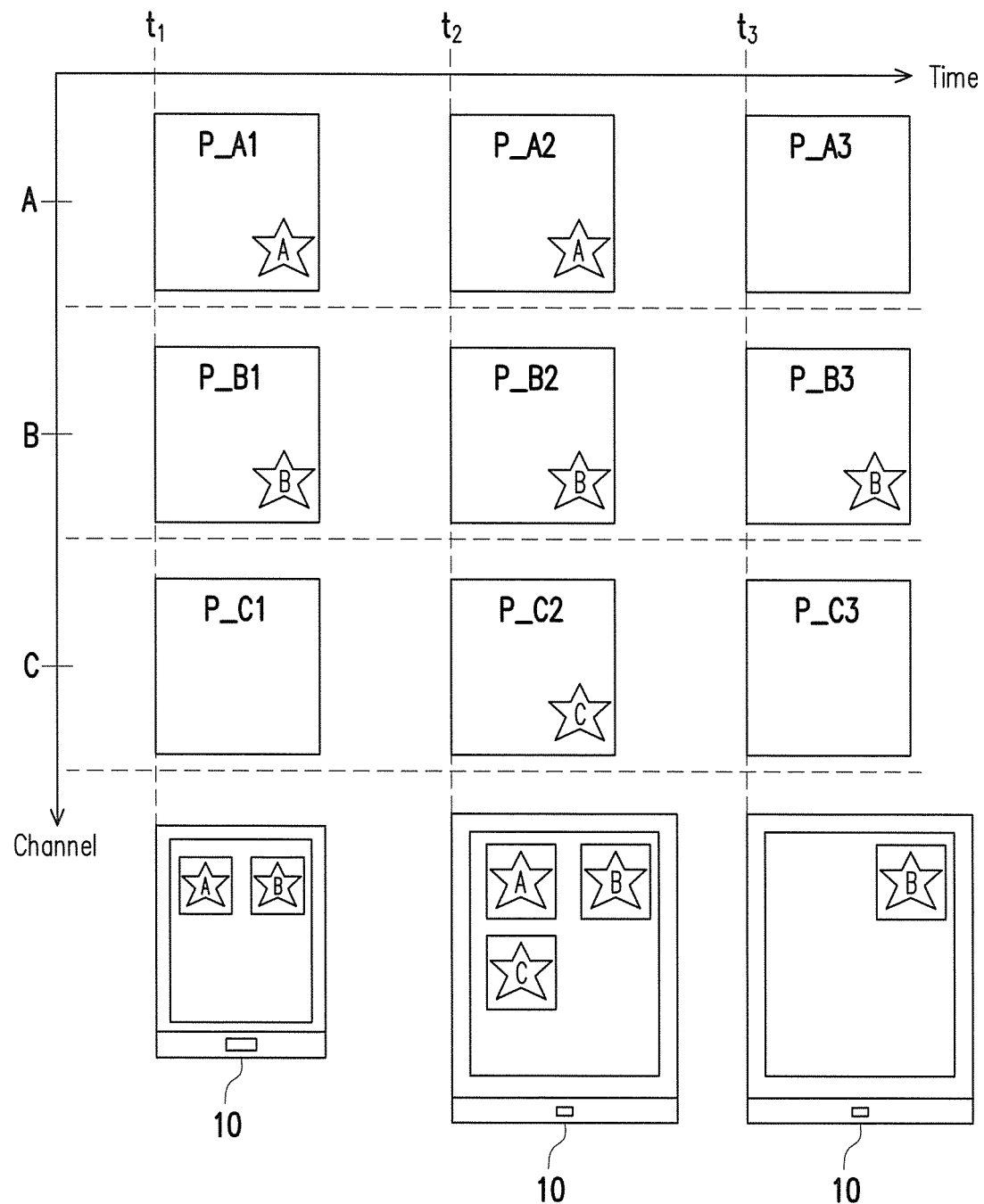
FIG. 3 is a schematic diagram illustrating an application situation of a multimedia content cross screen synchronization apparatus according to an embodiment of the disclosure.

FIG. 3 is a schematic diagram illustrating an application situation of a multimedia content cross screen synchronization apparatus according to an embodiment of the disclosure. A vertical axis shown in an upper part of FIG. 3 represents channels, and a horizontal axis represents time. The stream channel A respectively plays programs P_A1, P_A2, P_A3 at time t1, t2, t3, the stream channel B respectively plays programs P_B1, P_B2, P_B3 at time t1, t2, t3, and the stream channel C respectively plays programs P_C1, P_C2, P_C3 at time t1, t2, t3. In the embodiment of FIG. 3, the programs P_A1, P_A2, P_B1, P_B2, P_B3 and P_C2 respectively contain a prompt message S_prompt (for example, a start mark shown in FIG. 3), and the programs P_A3, P_C1 and P_C3 do not contain the prompt message S_prompt. The prompt messages S_prompt of the stream channels A, B and C can be different to each other.

Referring to FIG. 1 to FIG. 3, at the time t1, the program P_A1 and the program P_B1 of the display device 11 have different prompt messages S_prompt. According to the reply message provided by the server 12, the mobile device 10 may display the prompt messages S_prompt of the program P_A1 and the program P_B1 as that shown by a lower part of FIG. 3, so as to respectively prompt different corresponding behaviors of the stream channels A and B. During a period that the user 13 selects and views the program P_A1 of the stream channel A, if the user 13 is interested in the content of the program P_A1, the user 13 may click the prompt message S_prompt (the start mark of a mark "A") shown in the mobile device 10 according to the prompt of the prompt message S_prompt (the start mark of the mark "A") contained in the program P_A1. After the user 13 clicks the start mark of the mark "A" shown in the mobile device 10, the mobile device 10 transmits the corresponding feedback signal S_feedbalck (representing the behavior User_in of the user 13) to the server 12. Therefore, the server 12 may select the corresponding application service service_app0 corresponding to the program P_A1 of the stream channel A from a plurality of application services for providing to the mobile device 10 according to the feedback signal S_feedback. Deduced by analogy, during a period that the user 13 selects and views the program P_B1 of the stream channel B, after the user 13 clicks the prompt message S_prompt (the start mark of a mark "B") shown in the mobile device 10 according to the prompt of the prompt message S_prompt (the start mark of the mark "B") contained in the program P_B1, the server 12 may select the corresponding application service service_app0 corresponding to the program P_B1 of the stream channel B from a plurality of application services for providing to the mobile device 10. Therefore, the user 13 may perform the operation flow of the multimedia content cross screen synchronization of the aforementioned embodiment by touching the start mark on the screen of the mobile device 10.

It should be noted that although the star mark is adopted to serve as the prompt message S_prompt, implementation of the prompt message S_prompt is not limited thereto. In different embodiments, the prompt message S_prompt can also be presented through a static or dynamic manner by using other figure or image such as a color, a texture, a specific shape, a text, etc., so as to define the corresponding operation performed by the user.

In the first embodiment of the disclosure, the server 12 may learn that one selected channel in the stream channels of the display device 11 is currently viewed by the user 13 according to the feedback signal S_feedback. Therefore, the server 12 may select the corresponding application service service_app0 corresponding to the selected channel from a plurality of application services for providing to the mobile device 10. The corresponding application service service_app0 includes: providing extended information of a current program (or a current advertising) of the selected channel of the display device 11 to the mobile device 10. For example, it is assumed that the current advertising is an automobile advertising, the server 12 may take information such as vehicle related specifications, car dealer service networks, etc. as the extended information for providing to the mobile device 10.

Figure 4:
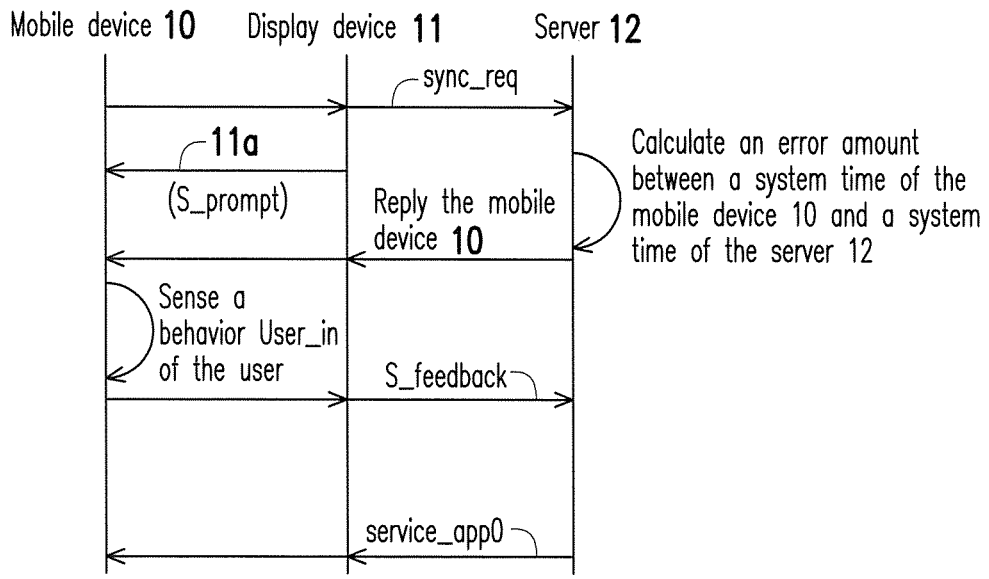
FIG. 4 is a timing schematic diagram of a communication protocol of a multimedia content cross screen synchronization apparatus according to another embodiment of the disclosure.

FIG. 4 is a timing schematic diagram of a communication protocol of a multimedia content cross screen synchronization apparatus according to another embodiment of the disclosure. Referring to FIG. 1 and FIG. 4, in the present embodiment, when the user 13 wants to use the multimedia content cross screen synchronization service, the user 13 may activate a cross screen application program on the mobile device 10. After the cross screen application program is activated, the cross screen application program of the mobile device 10 sends a start synchronization service request sync_req to the display device 11. After the display device 11 receives the start synchronization service request sync_req from the mobile device 10, the display device 11 may transmit the start synchronization service request sync_req to the server 12. After the server 12 receives the start synchronization service request sync_req sent by the mobile device 10, the server 12 obtains the system time of the mobile device 10 from the start synchronization service request sync_req, and calculates an error amount between the system time of the mobile device 10 and a system time of the server 12. In this way, the server 12 may decrease the probability of false determination of the viewing content caused by time setting inaccuracy of the mobile device 10 of the user 13 according to the calculated error amount. After the error amount is calculated, the server 12 may send a reply signal to the display device 11. The display device 11 may transmit the reply signal to the mobile device 10 to notify the mobile device 10 to start the multimedia content cross screen synchronization service.

The display device 11 may provide a plurality of stream channels to the user 13 for selection and viewing. The server 12 may add different prompt messages S_prompt to the multimedia contents of at least two channels in the plurality of stream channels. Therefore, the multimedia contents played by the at least two channels in the plurality of stream channels may contain different prompt messages S_prompt. These prompt messages S_prompt may prompt the user 13 to perform different corresponding behaviors. The mobile device 10 is configured with a sensor. Therefore, the mobile device 10 may sense the behavior User_in of the user 13 to generate the feedback signal S_feedback corresponding to the behavior User_in to the display device 11. When the display device 11 receives the feedback signal S_feedback corresponding to the prompt message S_prompt of at least one channel in the stream channels, the display device 11 may transmit the feedback signal S_feedback sent by the mobile device 10 to the server 12. In case that the behavior User_in of the user 13 conforms with the prompt message S_prompt of the display device 11, the feedback signal S_feedback corresponds to the corresponding behavior prompted by the prompt message S_prompt of at least one channel of the stream channels.

When the server 12 receives the feedback signal S_feedback corresponding to the prompt message S_prompt of at least one channel of the stream channels, the server 12 may select one corresponding application service service_app0 from a plurality of application services according to the feedback signal S_feedback. Then, the server 12 may provide the corresponding application service service_app0 corresponding to the image 11*a* of the currently played channel of the display device 11 to the display device 11. The display device 11 may transmit the corresponding application service service_app0 to the mobile device 10. Therefore, the cross screen synchronization can be implemented between the display content of the mobile device 10 (i.e. the corresponding application service service_app0) and the display content of the display device 11 (i.e. the image 11*a* of the currently played channel)

According to the above descriptions, the multimedia content cross screen synchronization apparatus, system and method thereof provided by the embodiments of the disclosure may sense the behavior/action of the user 13 through the mobile device 10, and then determine one of the stream channels viewed by the user 13 according to the behavior/action of the user 13. The multimedia content cross screen synchronization apparatus, system and method thereof may select one corresponding application service service_app0 from a plurality of application services according to the determination result, and provide the corresponding application service service_app0 to the mobile device 10. Therefore, the display content of the mobile device 10 and the display content of the display device 11 may implement cross screen synchronization.

Figure 5:
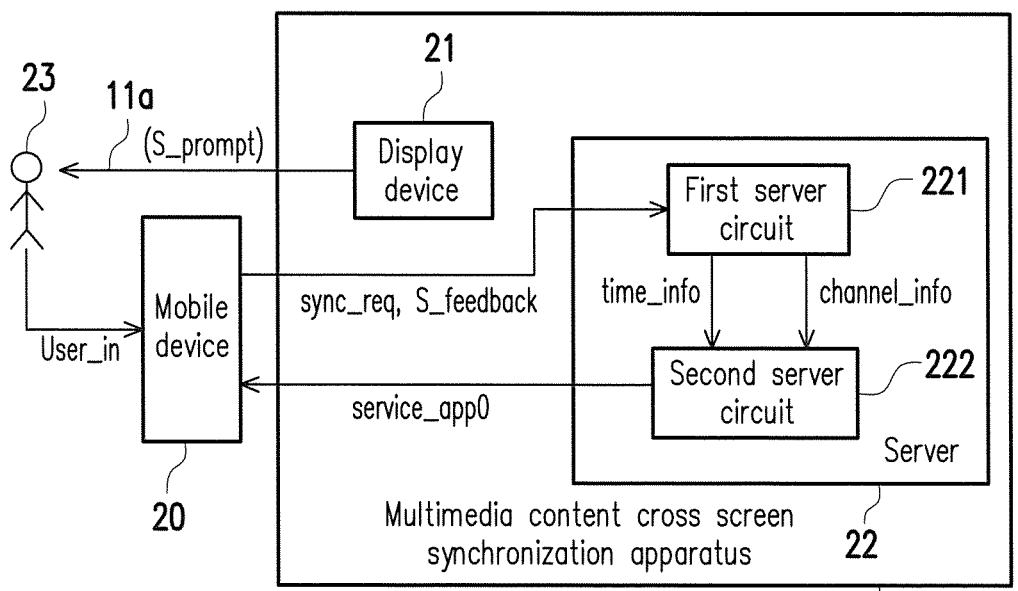
FIG. 5 is a circuit block schematic diagram of a multimedia content cross screen synchronization apparatus according to a second embodiment of the disclosure.

FIG. 5 is a circuit block schematic diagram of a multimedia content cross screen synchronization apparatus 2 according to a second embodiment of the disclosure. Description of a user 23, a mobile device 20, the multimedia content cross screen synchronization apparatus 2, a display device 21 and a server 22 of FIG. 5 may refer to related description of the user 13, the mobile device 10, the multimedia content cross screen synchronization apparatus 1, the display device 11 and the server 12 of FIG. 1, and details thereof are not repeated. In the embodiment of FIG. 2, the server 22 includes a first server circuit (or first server) 221 and a second server circuit (or second server) 222, the first server circuit 221 and the second server circuit 222 can be all located in the same server 22, or can be two separated devices.

Figure 6:
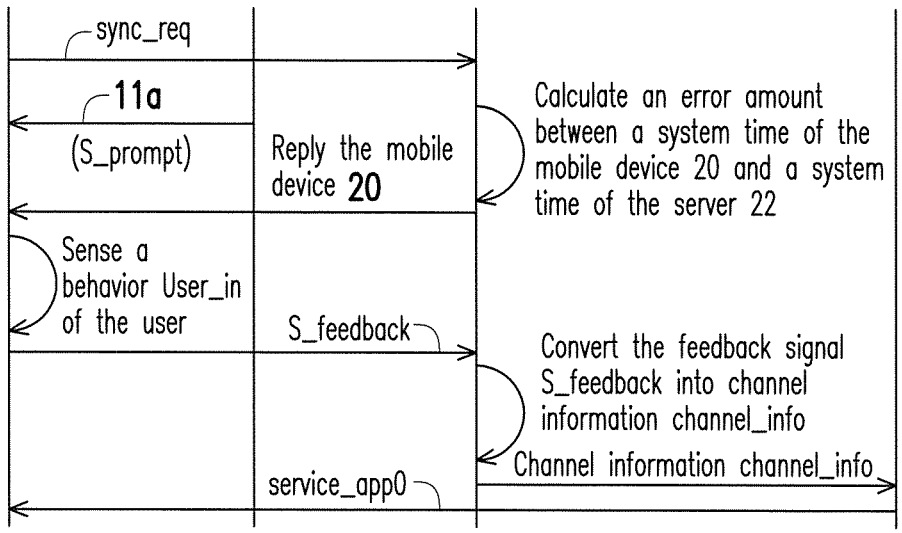
FIG. 6 is a timing schematic diagram of a communication protocol of a multimedia content cross screen synchronization apparatus according to the second embodiment of the disclosure.

FIG. 6 is a timing schematic diagram of a communication protocol according to the second embodiment of the disclosure. Referring to FIG. 5 and FIG. 6, in the present embodiment, when the user 23 wants to use the multimedia content cross screen synchronization service, the user 23 may activate the cross screen application program of the mobile device 20. After the cross screen application program is activated, the cross screen application program of the mobile device 20 sends a start synchronization service request sync_req to the first server circuit 221 of the server 22. After the first server circuit 221 receives the start synchronization service request sync_req from the mobile device 20, the first server circuit 221 obtains a system time of the mobile device 20 from the start synchronization service request sync_req, and calculates an error amount between the system time of the mobile device 20 and a system time of the server 22. In this way, the first server circuit 221 may decrease the probability of false determination of the viewing content caused by time setting inaccuracy of the mobile device 20 of the user 23 according to the calculated error amount. After the error amount is calculated, the first server circuit 221 may send a reply signal to the mobile device 20 to notify the mobile device 20 to start the multimedia content cross screen synchronization service.

The display device 21 may provide a plurality of stream channels for the user 23 to select and watch. For example, the user 23 may operate the display device 21 to select a channel of interest from the stream channels, and the display device 21 may play the image 11a of the channel of interest (the selected channel) to the user 23 for viewing. The mobile device 20 may sense the behavior User_in of the user 23 to generate the feedback signal S_feedback corresponding to the behavior User_in to the first server circuit 221. The first server circuit 221 may convert the feedback signal S_feedback provided by the mobile device 20 into channel information channel_info. The channel information channel_info may represent one selected channel in the plurality of stream channels of the display device 21. For example, the channel information channel_info may represent that a certain channel A is currently viewed by the user 23. The first server circuit 221 is coupled to the second server circuit 222. The first server circuit 221 may provide the channel information channel_info to the second server circuit 222.

The second server circuit 222 may select one corresponding application service service_app0 corresponding to the channel information channel_info to the mobile device 20 from a plurality of application services according to the channel information channel_info provided by the first server circuit 221. For example, if the channel information channel_info indicates that the selected channel is a news channel, the corresponding application service service_app0 can be a news poll, and if the channel information channel_info indicates that the selected channel is an advertising channel, the corresponding application service service_app0 can be an advertising shopping service. The second server circuit 222 may provide an over-the-top (OTT) service. Therefore, the cross-screen synchronization can be implemented between the display content of the mobile device 20 (i.e. the corresponding application service service_app0) and the display content of the display device 21 (i.e. the currently played channel image 11a).

In the second embodiment of the disclosure, the first server circuit 221 may further provide time information time_info to the second server 222. The time information time_info may represent a time point when the user 23 conducts the behavior User_in. The time information time_info may decrease a probability of false determination of the content viewed by the user 23, for example, when an advertising time is very short, and especially when a time interval for displaying the aforementioned extended information is very short.

In the second embodiment of the disclosure, the feedback signal S_feedback of the mobile device 20 may contain time information to represent a time point when the user 23 conducts the behavior User_in.

Figure 7:
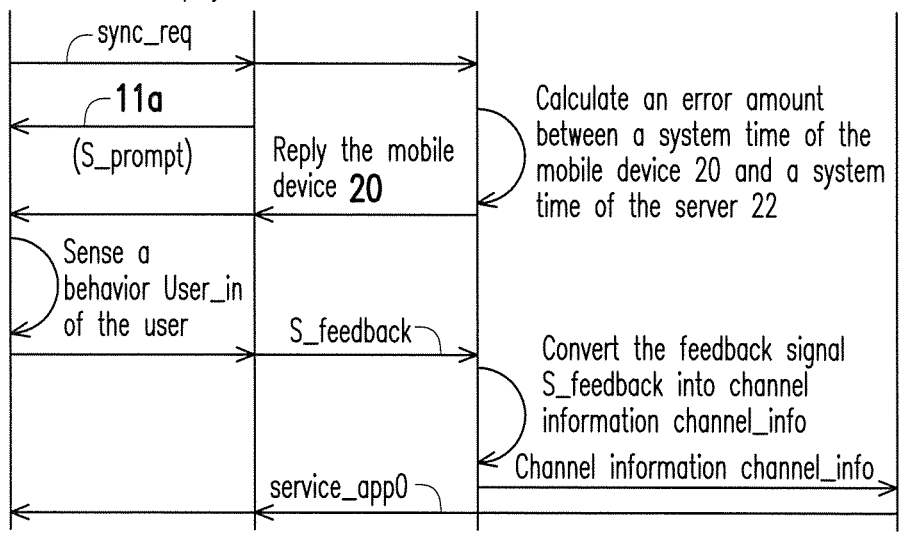
FIG. 7 is a timing schematic diagram of a communication protocol of a multimedia content cross screen synchronization apparatus according to still another embodiment of the disclosure.

FIG. 7 is a timing schematic diagram of a communication protocol of a multimedia content cross screen synchronization apparatus according to still another embodiment of the disclosure. Referring to FIG. 5 and FIG. 7, in the present embodiment, when the user 23 wants to use the multimedia content cross screen synchronization service, the user 23 may activate a cross screen application program on the mobile device 20. After the cross screen application program is activated, the cross screen application program of the mobile device 20 sends the start synchronization service request sync_req to the display device 21. After the display device 21 receives the start synchronization service request sync_req from the mobile device 20, the display device 21 may transmit the start synchronization service request sync_req to the first server circuit 221 of the server 22. After the first server circuit 221 receives the start synchronization service request sync_req sent by the mobile device 20, the first server circuit 221 may obtain the system time of the mobile device 20 from the start synchronization service request sync_req, and calculates an error amount between the system time of the mobile device 20 and a system time of the server 22. In this way, the first server circuit 221 may decrease the probability of false determination of the viewing content caused by time setting inaccuracy of the mobile device 20 of the user 23 according to the calculated error amount. After the error amount is calculated, the first server circuit 221 may send a reply signal to the display device 21. The display device 21 may transmit the reply signal to the mobile device 20 to notify the mobile device 20 to start the multimedia content cross screen synchronization service.

The display device 21 may provide a plurality of stream channels to the user 23 for viewing. The multimedia contents played by at least two channels in the stream channels may contain different prompt messages S_prompt. These prompt messages S_prompt may prompt the user 23 to perform different corresponding behaviors. The mobile device 20 is configured with a sensor. Therefore, the mobile device 20 may sense the behavior User_in of the user 23 to generate the feedback signal S_feedback corresponding to the behavior User_in to the display device 21. After the display device 21 receives the feedback signal S_feedback sent by the mobile device 20, the display device 21 may transmit the feedback signal S_feedback to the first server circuit 221. The first server circuit 221 may convert the feedback signal S_feedback provided by the mobile device 20 into the channel information channel_info. The channel information channel_info may represent one selected channel in the plurality of stream channels of the display device 21. For example, the channel information channel_info may represent that a certain channel A is currently viewed by the user 23. The first server circuit 221 is coupled to the second server circuit 222. The first server circuit 221 may provide the channel information channel_info to the second server circuit 222.

The second server circuit 222 may select one corresponding application service service_app0 corresponding to the channel information channel_info to the display device 21 from a plurality of application services according to the channel information channel_info provided by the first server circuit 221. The display device 21 may transmit the corresponding application service service_app0 to the mobile device 20. For example, if the channel information channel_info indicates that the selected channel is a news channel, the corresponding application service service_app0 can be a news poll, and if the channel information channel_info indicates that the selected channel is an advertising channel, the corresponding application service service_app0 can be an advertising shopping service. The second server circuit 222 may provide an over-the-top (OTT) service. Therefore, the cross-screen synchronization can be implemented between the display content of the mobile device 20 (i.e. the corresponding application service service_app0) and the display content of the display device 21 (i.e. the currently played channel image 11a).

Figure 8:
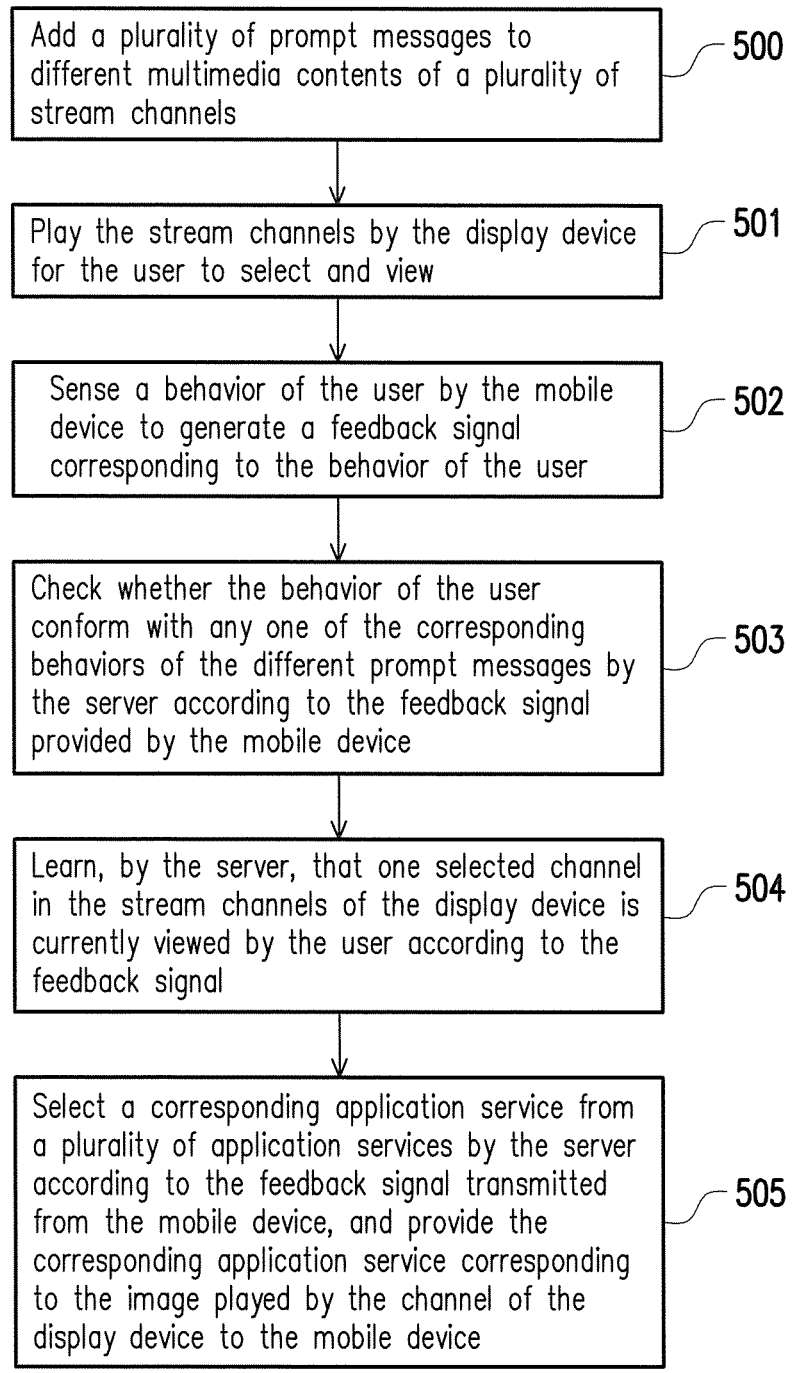
FIG. 8 is a flowchart illustrating a multimedia content cross screen synchronization method according to a fifth embodiment of the disclosure.

FIG. 8 is a flowchart illustrating a multimedia content cross screen synchronization method according to a fifth embodiment of the disclosure. The method flow shown in FIG. 8 includes steps 500-505. In the step 500, a plurality of prompt messages is added to different multimedia contents of a plurality of stream channels. Namely, the multimedia contents of at least two channels of the stream channels contain different prompt messages. According to a design requirement, the prompt messages can be subtitles, symbols or other visual messages displayed on a screen of the display device, or sounds or other auditory messages sent by the display device. These prompt messages may prompt the user to perform different corresponding behaviors. According to the design requirement, the corresponding behaviors include clicking a touch panel of the mobile device, clicking an icon displayed by the mobile device, sliding on the touch panel of the mobile device, shaking the mobile device, turning over the mobile device, tapping the mobile device, making the mobile device to move along a specific trajectory in space, or talking to the mobile device.

In the step 501, the display device, such as a television (TV) or other video stream playing device may play a plurality of stream channels for the user to select and view. These stream channels respectively play different multimedia contents such as advertising, TV program or other content. For example, the user may operate the display device to select one channel of interest from the plurality of stream channels. After the selection, the display device may play images of the channel of interest (the selected channel) for the user to view.

In the step 502, the mobile device may sense a behavior of the user to generate a feedback signal corresponding to the behavior of the user. The mobile device is configured with a sensor, for example, a touch panel, an optical sensor, a sound sensor, a gyro sensor, an acceleration sensor and/or other sensors. Therefore, the mobile device may sense the behavior of the user to generate the feedback signal corresponding to the behavior of the user to the server.

In the step 503, the server may check whether the behavior of the user conforms with any one of the corresponding behaviors of the different prompt messages according to the feedback signal provided by the mobile device. For example, the stream channels may contain a channel A and a channel B, where the channel A is playing a travel program, and the stream channel B is playing a food program. It is assumed that the prompt message contained in the travel program of the channel A is "tap the mobile device once", and the prompt message contained in the food program of the channel B is "tap the mobile device twice". During a period that the user selects and views the travel program of the channel A, if the user is interest in a scenery spot introduced in the travel program, the user may tap the mobile device once according to the prompt of the prompt message contained in the travel program. The mobile device transmits the feedback signal representing the behavior of the user to the server. The server confirms the behavior of to be "tap the mobile device once" according to the feedback signal, and the behavior of the user conforms with the corresponding behavior "tap the mobile device once" of the prompt message of the travel program played by the channel A. Deduced by analogy, during a period that the user selects and views the food program of the channel B, the user may tap the mobile device twice according to the prompt of the prompt message contained in the food program.

In the step 504, the server learns that one selected channel in the stream channels of the display device is currently viewed by the user according to the feedback signal.

In the step 505, the server selects a corresponding application service from a plurality of application services according to the feedback signal transmitted from the mobile device, and provides the corresponding application service corresponding to the image played by the channel of the display device to the mobile device. The corresponding application service includes: providing extended information of a current program (or a current advertising) of the selected channel of the display device to the mobile device. For example, it is assumed that the current advertising is an automobile advertising, the server may take information such as vehicle related specifications, car dealer service networks, etc. as the extended information for providing to the mobile device. Therefore, the cross screen synchronization can be implemented between the display content of the mobile device and the display content of the display device.

The disclosure provides a multimedia content cross screen synchronization apparatus, a multimedia content cross screen synchronization method, a display device and a server, which are adapted to mitigate recognition difficult caused by issues of user's ambient sound, light source, an environmental background and an operation flow when multimedia content viewed by the user is recognized through conventional voiceprint recognition or image recognition. When a clip containing the extended information is played in a TV channel, a program or advertising, the TV screen displays the specific prompt message of the program. The prompt message may prompt the user to perform a corresponding operation, for example to shake, turn over or tap the mobile device such as a mobile phone, a tablet PC, etc., or to click on or slide the device screen, etc. By using the mobile device to sense the behavior of the user, the server may determine the channel, program or advertising content viewed by the user. According to the determination result, the server may select one corresponding application service from a plurality of application services, and provide the corresponding application service to the mobile device. Therefore, the cross screen synchronization can be implemented between the display content of the mobile device and the display content of the display device.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. A multimedia content cross screen synchronization apparatus, adapted to interact with a mobile device, the multimedia content cross screen synchronization apparatus comprising:

a video player, providing a plurality of stream channels to a user to select, wherein each of the stream channels displays a multimedia content, the multimedia contents displayed by at least two channels of the stream channels contain different prompt messages, each of the at least two channels contains only one unique predefined prompt message out of the different prompt messages, and the prompt messages in different channels of the at least two channels of the stream channels prompt the user to perform different corresponding behaviours on the mobile device, wherein the mobile device senses one of the different corresponding behaviours performed on the mobile device to generate a behaviour sensing result as a feedback signal; and a server, receiving the feedback signal including the behaviour sensing result, provided by the mobile device based on sensing the only one unique predefined prompt message selected by the user, to determine which one of the at least two channels is currently viewed by the user, and selecting a corresponding application service from a plurality of application services according to the feedback signal transmitted from the mobile device, so as to provide the corresponding application service to the mobile device, wherein the feedback signal corresponds to the prompt message contained by the multimedia content of one of the stream channels, wherein prompting the user to perform the different corresponding behaviours on the mobile device comprises clicking a touch panel of the mobile device, clicking an icon displayed by the mobile device, sliding on the touch panel of the mobile device, shaking the mobile device, turning over the mobile device, tapping the mobile device, making the mobile device to move along a specific trajectory in space, or talking to the mobile device.

2. The multimedia content cross screen synchronization apparatus as claimed in claim 1, wherein the server checks whether the behaviour of the user conforms with any one of the different corresponding behaviours according to the feedback signal.

3. The multimedia content cross screen synchronization apparatus as claimed in claim 1, wherein the server learns that a selected channel in the stream channels is currently viewed by the user according to the feedback signal, and the server selects the corresponding application service corresponding to the selected channel among the application services to the mobile device.

4. The multimedia content cross screen synchronization apparatus as claimed in claim 1, wherein the corresponding application service comprises providing extended information of a current program or a current advertising of a selected channel of the video player to the mobile device.

5. The multimedia content cross screen synchronization apparatus as claimed in claim 1, wherein the server includes:
a first server circuit, configured to convert the feedback signal provided by the mobile device into a channel information, wherein the channel information represents that a selected channel in the stream channels is currently viewed by the user; and
a second server circuit, configured to select the corresponding application service corresponding to the channel information among the application services to the mobile device according to the channel information provided by the first server circuit.

6. The multimedia content cross screen synchronization apparatus as claimed in claim 5, wherein the first server circuit further provides a time information to the second server circuit, and the time information represents a time point when the user conducts one of the different corresponding behaviours.

7. The multimedia content cross screen synchronization apparatus as claimed in claim 1, wherein the feedback signal comprises a time information to represent a time point when the user conducts one of the different corresponding behaviours.

8. The multimedia content cross screen synchronization apparatus as claimed in claim 1, wherein the server is configured to receive a start synchronization service request sent by the mobile device, so as to obtain a system time of the mobile device from the start synchronization service request, and calculates an error between the system time of the mobile device and a system time of the server.

9. A multimedia content cross screen synchronization method, comprising:
providing a plurality of stream channels by a video player, to a user to select, wherein each of the stream channels displays a multimedia content, the multimedia contents displayed by at least two channels of the stream channels contain different prompt messages, each of the at least two channels contains only one unique predefined prompt message out of the different prompt messages, and the prompt messages in different channels of the at least two channels of the stream channels prompt the user to perform different corresponding behaviours on a mobile device;
using the mobile device to sense one of the different corresponding behaviours performed on the mobile device to generate a behaviour sensing result as a feedback signal, wherein the feedback signal corresponds to the prompt message contained in the multimedia content of one of the stream channels;
using a server to receive the feedback signal including the behaviour sensing result, provided by the mobile device based on sensing the only one unique predefined prompt message selected by the user, to determine which one of the at least two channels is currently viewed by the user;
selecting a corresponding application service from a plurality of application services by the server according to the feedback signal transmitted from the mobile device; and
providing the corresponding application service to the mobile device by the server,
wherein prompting the user to perform the different corresponding behaviours on the mobile device comprises clicking a touch panel of the mobile device, clicking an icon displayed by the mobile device, sliding on the touch panel of the mobile device, shaking the mobile device, turning over the mobile device, tapping the mobile device, making the mobile device to move along a specific trajectory in space, or talking to the mobile device.

10. The multimedia content cross screen synchronization method as claimed in claim 9, further comprising:
checking whether the behaviour of the user conforms with any one of the different corresponding behaviours by the server according to the feedback signal.

11. The multimedia content cross screen synchronization method as claimed in claim 9, wherein the corresponding application service comprises providing extended information of a current program or a current advertising of a selected channel of the video player to the mobile device.

12. The multimedia content cross screen synchronization method as claimed in claim 9, wherein the step of selecting the corresponding application service from the plurality of application services comprises:
converting the feedback signal provided by the mobile device into a channel information by a first server circuit, wherein the channel information represents that a selected channel in the stream channels is currently viewed by the user; and
selecting the corresponding application service corresponding to the channel information among the application services to the mobile device by a second server circuit according to the channel information.

13. The multimedia content cross screen synchronization method as claimed in claim 12, wherein the step of selecting the corresponding application service from the plurality of application services further comprises:
further providing a time information to the second server circuit by the first server circuit, wherein the time information represents a time point when the user conducts one of the different corresponding behaviours.

14. The multimedia content cross screen synchronization method as claimed in claim 9, wherein the feedback signal comprises a time information to represent a time point when the user conducts one of the different corresponding behaviours.

15. The multimedia content cross screen synchronization method as claimed in claim 9, further comprising:
- receiving a start synchronization service request sent from the mobile device by the server;
- obtaining a system time of the mobile device from the start synchronization service request by the server; and
- calculating an error between the system time of the mobile device and a system time of the server by the server.

16. A video player, coupled to a processor and adapted to interact with a mobile device, wherein the processor is configured to provide a plurality of stream channels to a user to select, each of the stream channels displays a multimedia content, the multimedia contents displayed by at least two channels of the stream channels contain different prompt messages, each of the at least two channels contains only one unique predefined prompt message out of the different prompt messages, the prompt messages in different channels of the at least two channels of the stream channels prompt the user to perform different corresponding behaviours on the mobile device,
- wherein the video player transmits a feedback signal including a behaviour sensing result to a server when the video player receives the feedback signal, wherein the feedback signal including the behaviour sensing result is generated based on sensing the only one unique predefined prompt message selected by the user, and the feedback signal including the behaviour sensing result serves to determine which one of the at least two channels is currently viewed by the user,
- wherein prompting the user to perform the different corresponding behaviours on the mobile device comprises clicking a touch panel of the mobile device, clicking an icon displayed by the mobile device, sliding on the touch panel of the mobile device, shaking the mobile device, turning over the mobile device, tapping the mobile device, making the mobile device to move along a specific trajectory in space, or talking to the mobile device.

17. A server, comprising a processor and adapted to interact with a mobile device, wherein the processor is configured to add different prompt messages to multimedia contents of at least two channels of a plurality of stream channels, each of the at least two channels contains only one unique predefined prompt message out of the different prompt messages, the prompt messages in different channels of the at least two channels of the stream channels prompt a user to perform different corresponding behaviours on the mobile device,
- wherein when the server receives a feedback signal including a behaviour sensing result, the server determines which one of the at least two channels is currently viewed by the user, and selects a corresponding application service from a plurality of application services to the mobile device according to the feedback signal including the behaviour sensing result, wherein the feedback signal including the behaviour sensing result is generated based on sensing the only one unique predefined prompt message selected by the user,
- wherein prompting the user to perform the different corresponding behaviours on the mobile device comprises clicking a touch panel of the mobile device, clicking an icon displayed by the mobile device, sliding on the touch panel of the mobile device, shaking the mobile device, turning over the mobile device, tapping the mobile device, making the mobile device to move along a specific trajectory in space, or talking to the mobile device.

18. The server as claimed in claim 17, wherein the processor is configured to receive a start synchronization service request sent by the mobile device, the server obtains a system time of the mobile device from the start synchronization service request, and the server calculates an error between the system time of the mobile device and a system time of the server.

19. The server as claimed in claim 17, wherein the feedback signal corresponds to a corresponding behaviour prompted by the prompt messages of the at least two channels of the stream channels.

* * * * *